United States Patent
Nakayama et al.

(10) Patent No.: US 10,241,570 B2
(45) Date of Patent: Mar. 26, 2019

(54) POINTING SUPPORT DEVICE, POINTING SUPPORT METHOD, AND NON-TRANSITORY COMPUTER-READABLE RECORDING MEDIUM

(71) Applicant: FUJITSU LIMITED, Kawasaki-shi, Kanagawa (JP)

(72) Inventors: Hiroshi Nakayama, Kawasaki (JP); Junichi Odagiri, Kawasaki (JP); Satoshi Nakashima, Kawasaki (JP); Kentaro Murase, Yokohama (JP); Masakiyo Tanaka, Hachioji (JP)

(73) Assignee: FUJITSU LIMITED, Kawasaki (JP)

( * ) Notice: Subject to any disclaimer, the term of this patent is extended or adjusted under 35 U.S.C. 154(b) by 90 days.

(21) Appl. No.: 15/331,983

(22) Filed: Oct. 24, 2016

(65) Prior Publication Data

US 2017/0139477 A1    May 18, 2017

(30) Foreign Application Priority Data

Nov. 12, 2015  (JP) ................................ 2015-222518

(51) Int. Cl.

| G06F 3/01 | (2006.01) |
|---|---|
| G06F 3/02 | (2006.01) |
| G06F 3/0481 | (2013.01) |
| G06F 3/0484 | (2013.01) |
| G06F 3/16 | (2006.01) |
| G06F 3/0482 | (2013.01) |
| G06F 3/0485 | (2013.01) |

(52) U.S. Cl.
CPC ............ *G06F 3/013* (2013.01); *G06F 3/0227* (2013.01); *G06F 3/0481* (2013.01); *G06F 3/0482* (2013.01); *G06F 3/0485* (2013.01); *G06F 3/04812* (2013.01); *G06F 3/04842* (2013.01); *G06F 3/167* (2013.01)

(58) Field of Classification Search
CPC .. G06F 3/013; G06F 3/04812; G06F 3/04842; G06F 3/0482; G06F 3/0481; G06F 3/167; G06F 3/0485; G06F 3/0227
See application file for complete search history.

(56) References Cited

U.S. PATENT DOCUMENTS

| 4,847,605 | A | * | 7/1989 | Callahan | ............. | G06F 3/04842 |
| | | | | | | 715/856 |
| 5,196,838 | A | * | 3/1993 | Meier | ................. | G06F 3/04812 |
| | | | | | | 345/684 |
| 5,331,335 | A | * | 7/1994 | Iida | ....................... | G06F 3/0485 |
| | | | | | | 345/684 |
| 5,360,971 | A | * | 11/1994 | Kaufman | ............... | A61B 3/113 |
| | | | | | | 250/221 |
| 5,670,955 | A | * | 9/1997 | Thorne, III | .......... | G06F 3/0338 |
| | | | | | | 178/18.03 |

(Continued)

FOREIGN PATENT DOCUMENTS

| JP | 2000-089905 | 3/2000 |
| JP | 2004-287823 | 10/2004 |

*Primary Examiner* — Mihir K Rayan
(74) *Attorney, Agent, or Firm* — Fujitsu Patent Center

(57) ABSTRACT

A pointing support device detects user's gaze position on a screen, sets the gaze position as an initial position of a pointer, displays a path starting from the initial position on the screen on the basis of path definition information, which defines the path to move the pointer and a movement pattern of the path and moves the pointer along the path.

15 Claims, 14 Drawing Sheets

(56) References Cited

U.S. PATENT DOCUMENTS

| | | | | |
|---|---|---|---|---|
| 5,689,619 A | * | 11/1997 | Smyth | G02B 27/0093 345/156 |
| 5,774,111 A | * | 6/1998 | Lecland | G06F 3/04812 345/666 |
| 5,870,079 A | * | 2/1999 | Hennessy | G06F 3/04812 345/157 |
| 6,204,828 B1 | * | 3/2001 | Amir | G06F 3/013 345/156 |
| 6,239,845 B1 | * | 5/2001 | Itagaki | G06F 3/0486 348/552 |
| 6,587,131 B1 | * | 7/2003 | Nakai | G06F 3/04812 715/857 |
| 2002/0075333 A1 | * | 6/2002 | Dutta | G06F 3/04842 715/862 |
| 2003/0043214 A1 | * | 3/2003 | Thompson | G06F 3/04842 715/863 |
| 2004/0113955 A1 | * | 6/2004 | Kosugi | G06F 3/038 715/856 |
| 2005/0047629 A1 | * | 3/2005 | Farrell | G06F 3/013 382/117 |
| 2005/0116929 A1 | * | 6/2005 | Molander | G06F 3/013 345/157 |
| 2009/0327963 A1 | * | 12/2009 | Mouilleseaux | G06F 3/0482 715/834 |
| 2011/0006978 A1 | * | 1/2011 | Yuan | G06F 3/013 345/156 |
| 2011/0107275 A1 | * | 5/2011 | Kuo | G06F 3/038 715/856 |
| 2013/0120248 A1 | * | 5/2013 | Gilra | G06F 3/04812 345/157 |
| 2013/0169533 A1 | * | 7/2013 | Jahnke | G06F 3/017 345/158 |
| 2014/0040834 A1 | * | 2/2014 | Thompson | G06F 3/0481 715/856 |
| 2017/0245753 A1 | * | 8/2017 | Donaldson | A61B 3/024 |

\* cited by examiner

POINTING SUPPORT DEVICE, POINTING SUPPORT METHOD, AND NON-TRANSITORY COMPUTER-READABLE RECORDING MEDIUM

CROSS-REFERENCE TO RELATED APPLICATION(S)

This application is based upon and claims the benefit of priority of the prior Japanese Patent Application No. 2015-222518, filed on Nov. 12, 2015, the entire contents of which are incorporated herein by reference.

FIELD

The embodiments discussed herein are related to a pointing support device, etc.

BACKGROUND

In recent years, information technology devices equipped with a graphical user interface (GUI), such as personal computers (PCs), tablet terminals, and smartphones, have been in widespread use. A user operates an information technology device by pointing to a target, such as an icon, a button, or a command tab, located at any position on a GUI.

Pointing on an information technology device is performed by a user performing a mouse operation with his/her upper limb or an operation on a touch panel with his/her finger. Therefore, physically handicapped persons, elderly people, and the like whose upper limbs or fingers do not function well are unable to operate an information technology device equipped with a GUI.

To cope with this problem, there is a gaze input technology that detects user's gaze position on a screen thereby enabling the user to perform pointing without having to perform a direct operation with his/her upper limb or finger. For example, Conventional Technology 1 is provided as an example of the technology for performing pointing through a gaze input.

Conventional Technology 1 is a technology to control the speed of moving a pointer according to the distance between the gaze position and the pointer position, and move the pointer close to the gaze position, and then, when the distance between the gaze position and the pointer position has become within a predetermined range, fix the pointer position.

However, Conventional Technology 1 is premised on detecting user's gaze position with high accuracy. In general, the accuracy of detecting the gaze position allows for a margin of error of about 20 mm from the actual gaze position; therefore, it is difficult to move the pointer to user's intended position. Incidentally, a device capable of detecting the gaze position with high accuracy is expensive, and it is difficult for such a device to be mounted in an information technology device as standard.

On the other hand, there is Conventional Technology 2 to suppress a margin of error in the gaze position. Conventional Technology 2 is for correcting a position gap between the gaze position and an object supposed to be selected as the gaze position on the basis of input correction information. The correction information is input to a device by a user him/herself operating an input device.

Patent Literature 1: Japanese Laid-open Patent Publication No. 2004-287823

Patent Literature 2: Japanese Laid-open Patent Publication No. 2000-89905

However, the above-mentioned conventional technologies are not capable of performing pointing appropriately through a gaze input.

For example, according to Conventional Technology 2, a margin of error in the gaze position can be reduced by correcting the gaze position on the basis of correction information; however, a user him/herself operates an input device to input the correction information, and therefore physically handicapped persons, elderly people, and the like have difficulty handling it.

One aspect of the technology discussed herein is intended to provide a pointing support device, pointing support method, and pointing support program capable of performing pointing appropriately through a gaze input.

SUMMARY

According to an aspect of an embodiment, a pointing support device includes a processor that executes a process including: detecting user's gaze position on a screen; setting the gaze position as an initial position of a pointer; displaying a path starting from the initial position on the screen on the basis of path definition information, which defines the path to move the pointer and a movement pattern of the path; and moving the pointer along the path.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. Incidentally, the technology discussed herein is not limited by these embodiments.

[a] First Embodiment

Figures 1, 2:
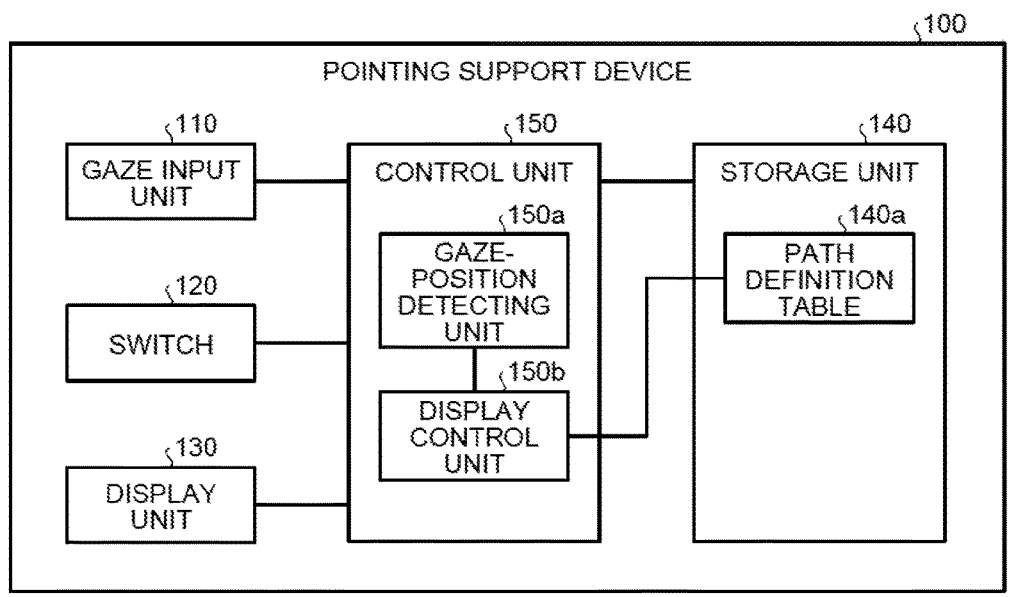
FIG. 1 is a functional block diagram illustrating a configuration of a pointing support device according to a first embodiment.
FIG. 2 is a diagram illustrating an example of the data structure of a path definition table.

A configuration of a pointing support device according to a first embodiment is explained. FIG. 1 is a functional block diagram illustrating the configuration of the pointing support device according to the first embodiment. As illustrated in FIG. 1, a pointing support device 100 includes a gaze input unit 110, a switch 120, a display unit 130, a storage unit 140, and a control unit 150.

The gaze input unit 110 is a device for inputting a user's gaze. For example, the gaze input unit 110 corresponds to a camera. The gaze input unit 110 takes a user's face image, and outputs data of the taken face image to the control unit 150.

The switch 120 is a switch including a button that is able to be pressed by a user. The switch outputs a signal indicating whether or not the button is being pressed to the control unit 150. The switch 120 is an example of a receiving unit.

The display unit 130 is a display device that displays thereon a variety of information output from the control unit 150. The display unit 130 corresponds to a liquid crystal display, a touch panel, or the like.

The storage unit 140 includes a path definition table 140a. The storage unit 140 corresponds to a semiconductor memory device, such as a random access memory (RAM), a read-only memory (ROM), or a flash memory, or a storage device, such as a hard disk drive (HDD).

The path definition table 140a is a table holding path definition information that defines a path to move a pointer and a movement pattern of the path. FIG. 2 is a diagram illustrating an example of the data structure of a path definition table. As illustrated in FIG. 2, this path definition table 140a associates path-definition identification information with multiple steps. The path-definition identification information is information that uniquely identifies a path definition. The steps indicate steps for moving a path or steps for moving a pointer along a path. There are various path definitions; however, here, first to third path definitions are explained as an example.

Figure 3:
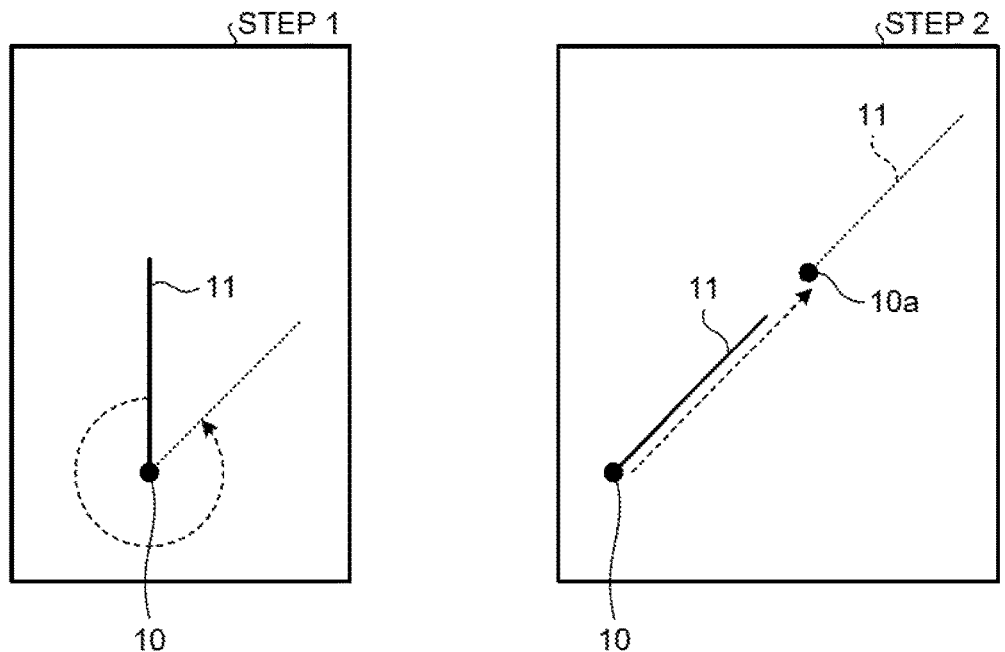
FIG. 3 is a diagram for explaining a first path definition.

FIG. 3 is a diagram for explaining the first path definition. The first path definition has Steps 1 and 2. Step 1 of the first path definition is a step of displaying a linear movement bar 11 starting from a current pointer position 10 and moving the linear movement bar 11 rotationally around the pointer position 10.

Step 2 of the first path definition is a step of moving the linear movement bar 11 of which the direction has been determined at Step 1 of the first path definition linearly in a direction indicated by the linear movement bar 11. A pointer position 10a moves along with the movement of the linear movement bar 11. In the first path definition, a path is the linear movement bar 11.

Figure 4:
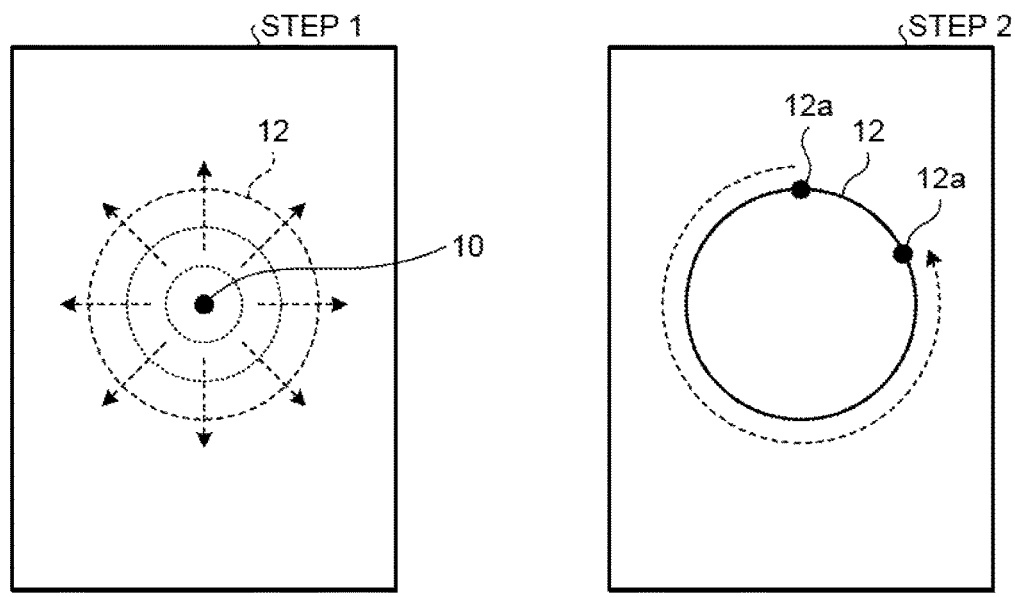
FIG. 4 is a diagram for explaining a second path definition.

FIG. 4 is a diagram for explaining the second path definition. The second path definition has Steps 1 and 2. Step 1 of the second path definition is a step of concentrically expanding a circle 12 centered at a current pointer position 10.

Step 2 of the second path definition is a step of moving a pointer position 12a from an arbitrary position on the circle 12, which has been determined at Step 1 of the second path definition, along the circle 12. In the second path definition, a path is the circle 12.

Figure 5:
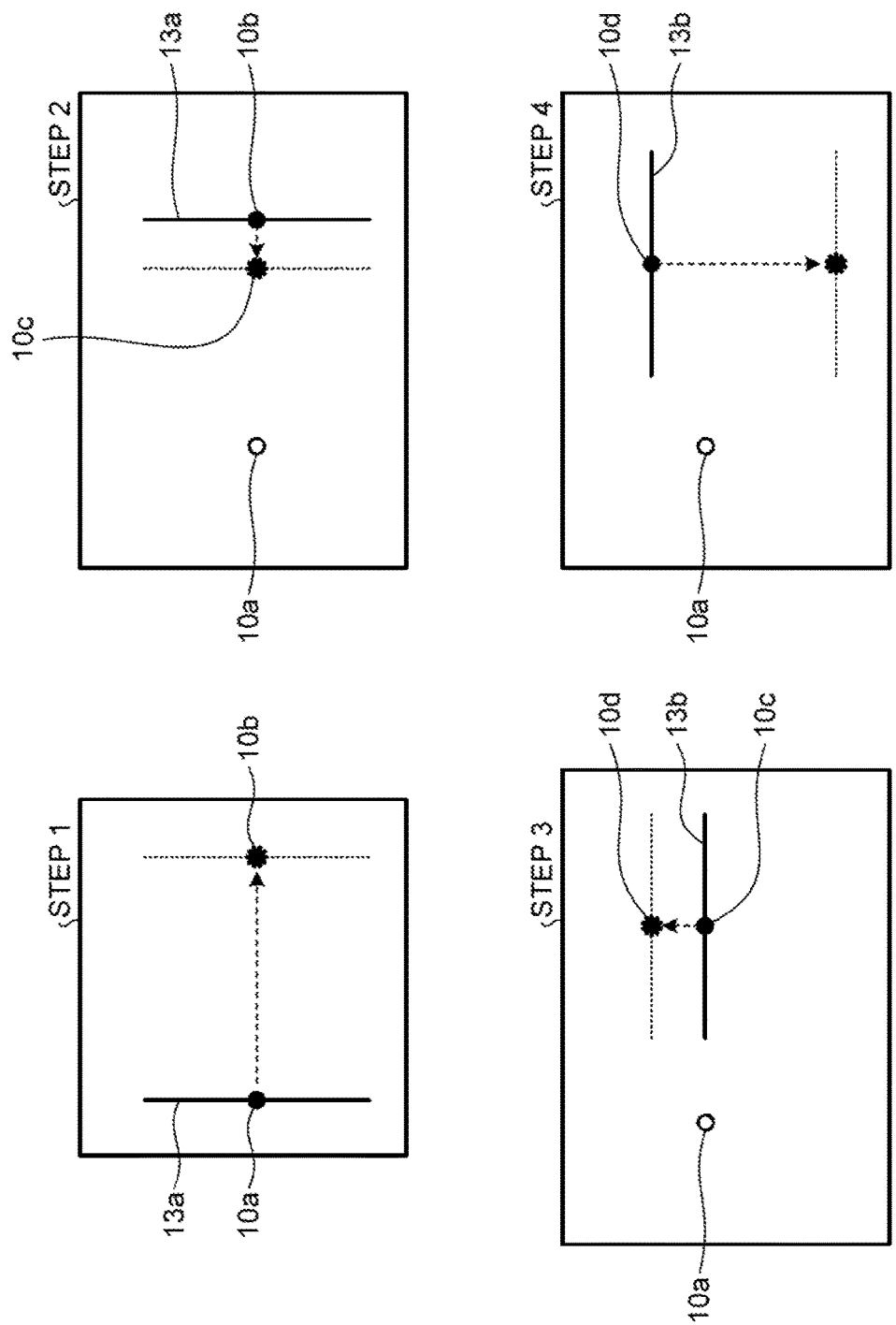
FIG. 5 is a diagram for explaining a third path definition.

FIG. 5 is a diagram for explaining the third path definition. The third path definition has Steps 1 to 4. Step 1 of the third path definition is a step of moving a pointer with a vertical guide 13a from a current pointer position 10a to the right horizontally.

Step 2 of the third path definition is a step of moving the pointer with the vertical guide 13a from a pointer position 10b determined in the movement at Step 1 to the left horizontally.

Step 3 of the third path definition is a step of moving vertically up the pointer with a horizontal guide 13b from a pointer position 10c determined in the movement at Step 2.

Step 4 of the third path definition is a step of moving vertically down the pointer with the horizontal guide 13b from a pointer position 10d determined in the movement at Step 3.

Incidentally, the above-described third path definition is just an example; Steps 2 and 4 can be omitted from Steps 1 to 4 of the third path definition, or Steps 1 and 3 can be omitted.

To return to the explanation of FIG. 1, the control unit 150 includes a gaze-position detecting unit 150a and a display control unit 150b. The control unit 150 corresponds to an integrated device, such as an application specific integrated circuit (ASIC) or a field programmable gate array (FPGA). Or, the control unit 150 corresponds to an electronic circuit, such as a central processing unit (CPU) or a micro processing unit (MPU).

The gaze-position detecting unit 150a is a processing unit that detects user's gaze position on the screen of the display unit 130. The gaze-position detecting unit 150a outputs information on the gaze position to the display control unit 150b.

The gaze-position detecting unit 150a can detect person's gaze position by using any conventional technology. For example, each time the gaze-position detecting unit 150a acquires face image data from the gaze input unit 110, the gaze-position detecting unit 150a analyzes an image of the face image data and identifies a reference point and moving point of user's eye. The gaze-position detecting unit 150a detects user's gaze position from a relationship between the reference point and the moving point. A combination of the reference point and the moving point is the inner corner and iris of user's eye, or is the corneal reflex and pupil of user's eye. The gaze-position detecting unit 150a can detect the gaze position by using a technology described in Japanese Laid-open Patent Publication No. 2012-187190.

The display control unit 150b is a processing unit that sets the gaze position as an initial position of a pointer, and displays a path starting from the initial position on the screen of the display unit 130 on the basis of the path definition table 140a and moves the pointer along the path.

Figure 6:
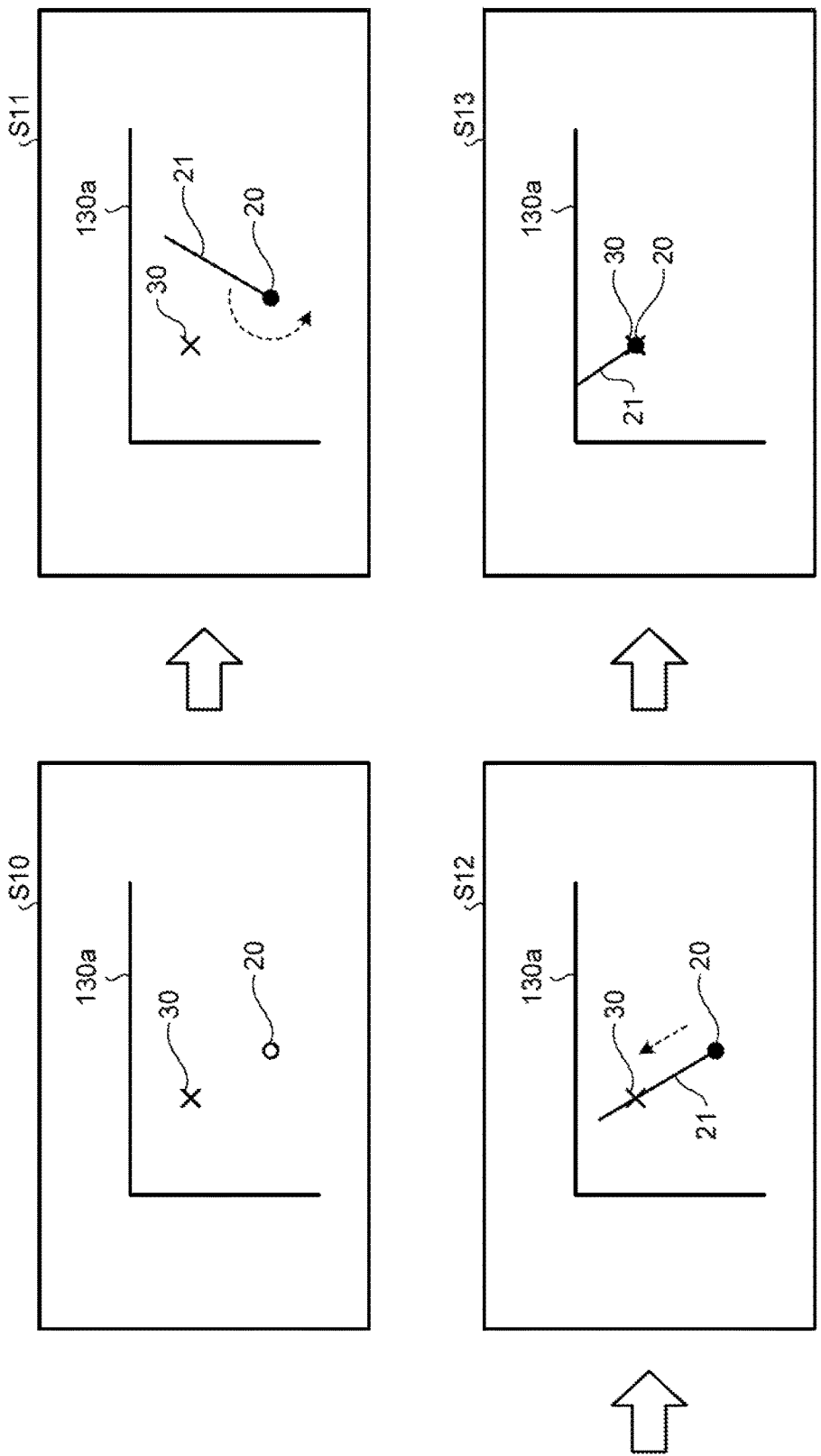
FIG. 6 is a diagram for explaining a process performed by a display control unit according to the first embodiment.

FIG. 6 is a diagram for explaining a process performed by a display control unit according to the first embodiment. FIG. 6 illustrates a case where the display control unit 150b performs the process on the basis of the first path definition of the path definition table 140a as an example.

Step S10 illustrates that a pointing target 30 and a gaze position 20 exist on a screen 130a of the display unit 130. The display control unit 150b identifies the location of the gaze position 20 on the basis of gaze position information acquired from the gaze-position detecting unit 150a. Until the button of the switch 120 is pressed, the display control unit 150b updates the gaze position 20 each time the display control unit 150b acquires information on the gaze position 20 from the gaze-position detecting unit 150a.

Step S11 illustrates that when the button of the switch 120 has been pressed by the user, and the display control unit 150b has received a signal from the switch 120, the display control unit 150b sets the gaze position 20 as an initial position of a pointer. For example, while the button of the switch 120 is being pressed, the display control unit 150b displays a linear movement bar 21 and rotates the linear movement bar 21 around the initial pointer position 20.

When rotating the linear movement bar 21, the display control unit 150b can adjust the rotating speed according to pressing force applied to the button of the switch 120. The display control unit 150b shall acquire information on pressing force applied to the button from the switch 120. If the pressing force applied to the button is equal to or more than a threshold, the display control unit 150b rotates the linear movement bar 21 at a first rotating speed. If the pressing force applied to the button is less than the threshold, the display control unit 150b rotates the linear movement bar 21 at a second rotating speed. The first rotating speed shall be greater than the second rotating speed.

Step S12 illustrates that the user refers to the screen 130a and releases the button of the switch 120 at the timing when the linear movement bar 21 has overlapped with the target 30. When the display control unit 150b has detected that the button of the switch 120 has become not pressed, the display control unit 150b stops rotating the linear movement bar 21. Then, the display control unit 150b moves the linear movement bar 21 linearly in a direction indicated by the linear movement bar 21.

Step S13 illustrates that the user refers to the screen 130a and presses the button of the switch 120 at the point of time when the starting point of the linear movement bar 21 (the pointer position 20) has overlapped with the target 30. When the display control unit 150b has detected that the button of the switch 120 has been pressed at the point of time when the starting point of the linear movement bar 21 (the pointer position 20) has overlapped with the target 30, the display control unit 150b determines that the target 30 has been selected. The display control unit 150b performs a predetermined process due to the selection of the target 30.

The display control unit 150b performs the processes at Steps S10 to S13 illustrated in FIG. 6, thereby can perform pointing appropriately through a gaze input. For example, each time the button of the switch 120 is pressed, the initial position of the pointer is set, and the linear movement bar 21 is rotated, and then the linear movement bar 21 is moved linearly; through these steps, a target 30 can be selected. Accordingly, even if the accuracy of the gaze position is low, it is possible to select a target 30 appropriately. Furthermore, pressing the button of the switch 120 is a simple operation, so even physically handicapped persons, elderly people, and the like can handle it.

Incidentally, in the example illustrated at Steps S10 to S13, the timing when the button of the switch 120 has been pressed and the timing when the button of the switch 120 has become not pressed are explained as the timing to switch the process; however, the switching timing is not limited to these. For example, the display control unit 150b can switch the process at the timing when the button of the switch 120 has been pressed, and does not need to consider the button having become not pressed as the switching timing.

Figure 7:
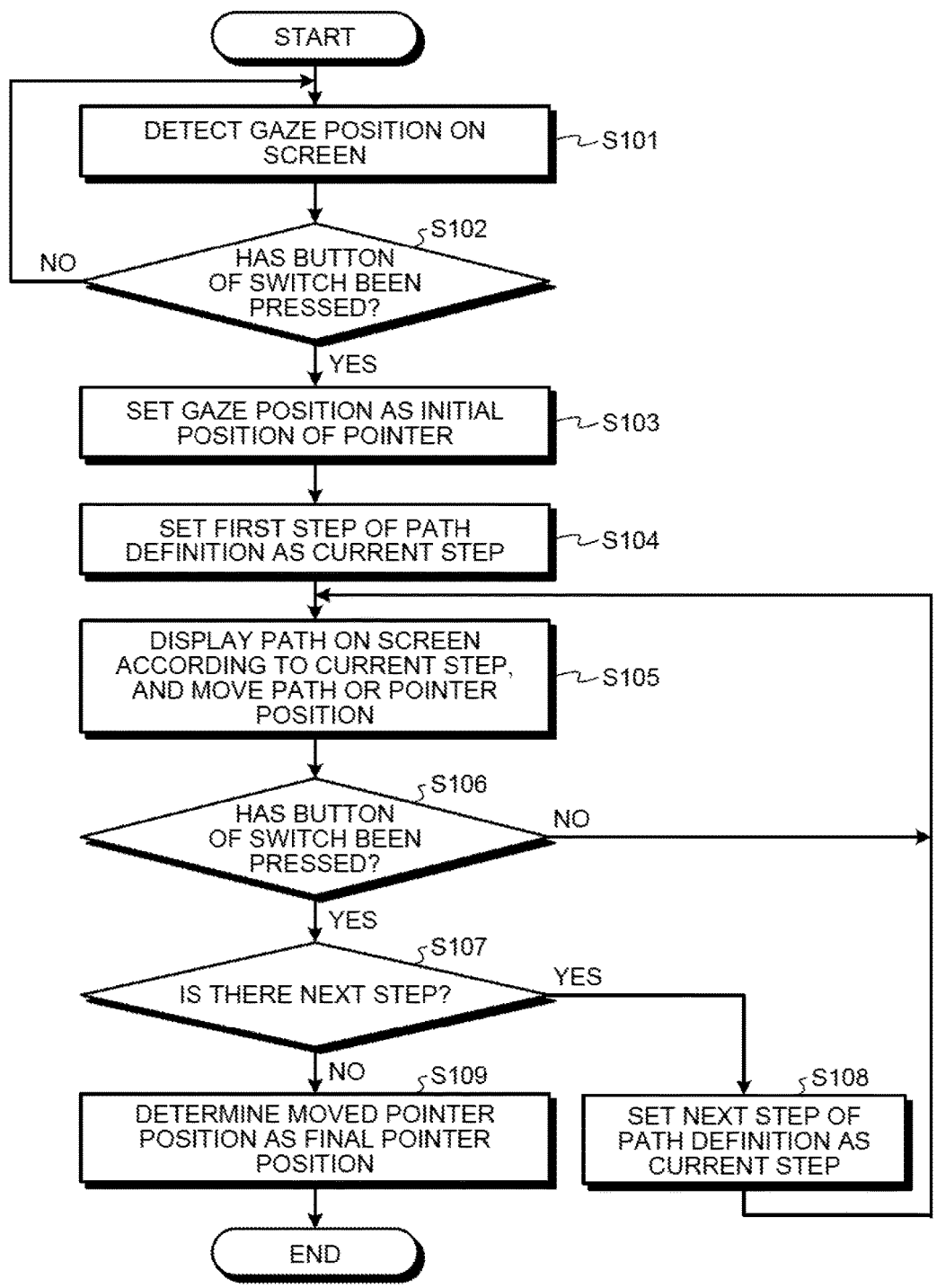
FIG. 7 is a flowchart illustrating a procedure of processing by the pointing support device according to the first embodiment.

Subsequently, a procedure of processing by the pointing support device 100 according to the first embodiment is explained. FIG. 7 is a flowchart illustrating the procedure of processing by the pointing support device according to the first embodiment. As illustrated in FIG. 7, the gaze-position detecting unit 150a of the pointing support device 100 detects the gaze position on the screen (Step S101). If the button of the switch 120 has not been pressed (NO at Step S102), the display control unit 150b of the pointing support device 100 returns the process to Step S101.

On the other hand, if the button of the switch 120 has been pressed (YES at Step S102), the display control unit 150b sets the gaze position as an initial position of a pointer (Step S103). The display control unit 150b refers to the path definition table 140a, and sets the first step of a path definition as the current step (Step S104).

The display control unit 150b displays a path on the screen according to the current step and moves the path or the pointer position (Step S105). If the button of the switch 120 has not been pressed (NO at Step S106), the display control unit 150b returns the process to Step S105 again.

On the other hand, if the button of the switch 120 has been pressed (YES at Step S106), the display control unit 150b determines whether there is the next step (Step S107). If there is the next step (YES at Step S107), the display control unit 150b sets the next step of the path definition as the current step (Step S108), and returns the process to Step S105.

On the other hand, if there is no next step (NO at Step S107), the display control unit 150b determines the moved pointer position as the final pointer position (Step S109).

Subsequently, advantageous effects of the pointing support device 100 according to the first embodiment are explained. The pointing support device 100 sets the gaze position as an initial position of a pointer, and displays a path starting from the initial position on the screen on the basis of the path definition table 140a and moves the pointer along the path. Therefore, even if the accuracy of the gaze position is low, it is possible to move the pointer position from the initial position to a target according to a path definition, and possible to point to the target appropriately.

When the display control unit 150b has received a signal indicating that the button of the switch 120 has been pressed, the display control unit 150b sets the gaze position at the time of the receipt of the signal as an initial position of a pointer. The display control unit 150b displays a path starting from the initial position on the screen and moves the pointer along the path. Pressing the button of the switch 120 is a simple operation, so even physically handicapped persons, elderly people, and the like can handle it.

After having received a signal indicating whether the button of the switch 120 is being pressed, the display control unit 150b moves a path or a pointer while the button is being pressed, and stops moving the path or the pointer at the timing when the button has become not pressed. Through this process, the user just releases the button that the user is pressing, thereby can makes the transition to the next process and perform a pointing operation efficiently.

The display control unit 150b controls the speed of moving the path or pointer according to pressing force applied to the button. Therefore, the user can adjust the speed of moving the path or the pointer according to his/her preference.

[b] Second Embodiment

Figure 8:
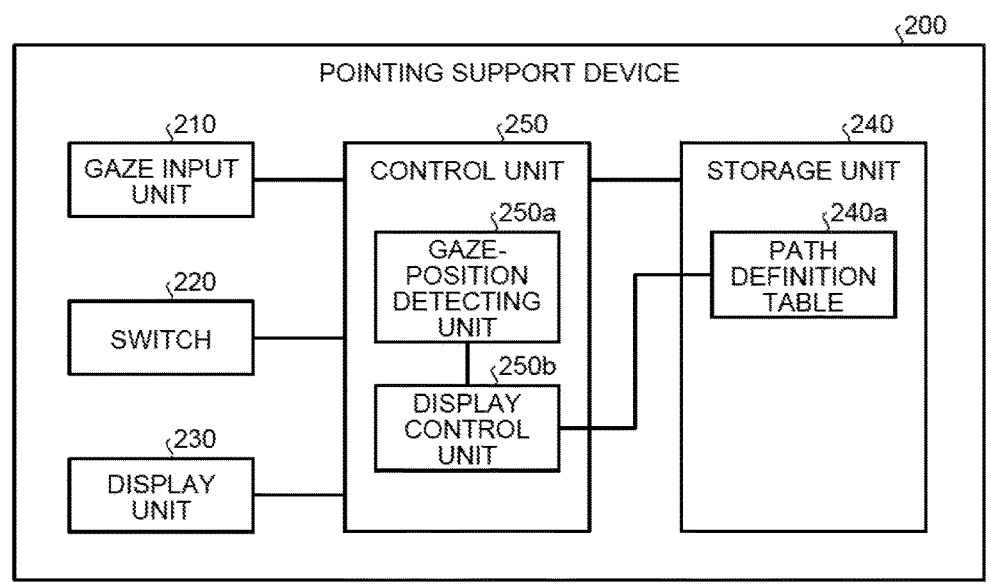
FIG. 8 is a functional block diagram illustrating a configuration of a pointing support device according to a second embodiment.

Subsequently, a configuration of a pointing support device according to a second embodiment is explained. FIG. 8 is a functional block diagram illustrating the configuration of the pointing support device according to the second embodiment. As illustrated in FIG. 8, a pointing support device 200 includes a gaze input unit 210, a switch 220, a display unit 230, a storage unit 240, and a control unit 250.

The gaze input unit 210 and the display unit 230 are the same as the gaze input unit 110 and the display unit 130 according to the first embodiment, so description of these units is omitted.

The switch 220 is a switch including a button that is able to be pressed by a user. For example, the user operates the switch 220 and single- or double-clicks the button. Single-clicking the button here means that the user presses the button of the switch 220 once. Double-clicking the button here means that the user presses the button of the switch 220 once and then again presses the button within a given length of time. When the switch 220 has received a single-click on the button, the switch 220 outputs a signal indicating the receipt of a single-click to the control unit 250. When the switch 220 has received a double-click on the button, the switch 220 outputs a signal indicating the receipt of a double-click to the control unit 250.

The storage unit 240 includes a path definition table 240a. The storage unit 240 corresponds to a semiconductor memory device, such as a RAM, a ROM, or a flash memory, or a storage device, such as an HDD.

The path definition table 240a is a table holding path definition information that defines a path to move a pointer and a movement pattern of the path. The data structure of the path definition table 240a is the same as that of the path definition table 140a illustrated in FIG. 2, so description of the data structure of the path definition table 240a is omitted.

The control unit 250 includes a gaze-position detecting unit 250a and a display control unit 250b. The control unit 250 corresponds to an integrated device, such as an ASIC or an FPGA. Or, the control unit 250 corresponds to an electronic circuit, such as a CPU or an MPU.

The gaze-position detecting unit 250a is a processing unit that detects user's gaze position on the screen of the display unit 230. The gaze-position detecting unit 250a outputs information on the gaze position to the display control unit 250b. The other functions of the gaze-position detecting unit 250a are the same as the gaze-position detecting unit 150a described in the first embodiment.

The display control unit 250b is a processing unit that sets the gaze position as an initial position of a pointer, and displays a path starting from the initial position on the screen of the display unit 230 on the basis of the path definition table 240a and moves the pointer along the path. Furthermore, if, while moving the pointer along the path, the display control unit 250b has acquired a signal from the switch 220, the display control unit 250b moves the path so as to display the path starting from the position of the pointer at the time of the acquisition of the signal on the screen, and moves the pointer along the path.

Figure 9:
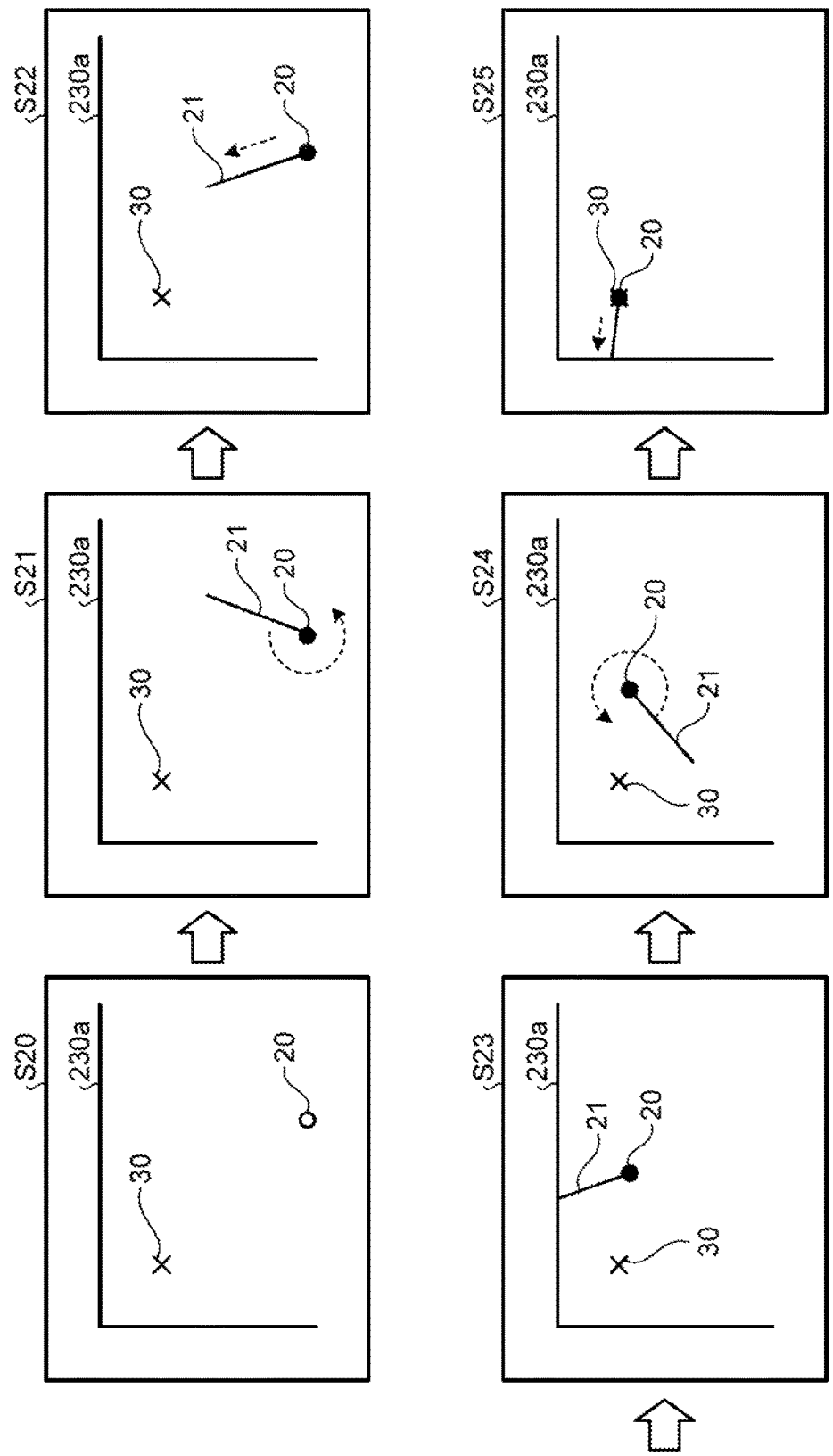
FIG. 9 is a diagram for explaining a process performed by a display control unit according to the second embodiment.

FIG. 9 is a diagram for explaining a process performed by a display control unit according to the second embodiment. FIG. 9 illustrates a case where the display control unit 250b performs the process on the basis of a first path definition of the path definition table 240a as an example.

Step S20 illustrates that a pointing target 30 and a gaze position 20 exist on a screen 230a of the display unit 230. The display control unit 250b identifies the location of the gaze position 20 on the basis of gaze position information acquired from the gaze-position detecting unit 250a. Until the switch 220 is single-clicked, the display control unit 250b updates the gaze position 20 on the screen 230a each time the display control unit 250b acquires information on the gaze position 20 from the gaze-position detecting unit 250a.

Step S21 illustrates that when the button of the switch 220 has been single-clicked by the user, and the display control unit 250b has received a signal from the switch 220, the display control unit 250b sets the gaze position 20 as an initial pointer position. For example, while the button of the switch 220 is being pressed, the display control unit 250b displays a linear movement bar 21 and rotates the linear movement bar 21 around the initial pointer position 20.

Step S22 illustrates that the user refers to the screen 230a and releases the button of the switch 220 at certain timing. When the display control unit 250b has detected that the button of the switch 220 has become not pressed, the display control unit 250b stops rotating the linear movement bar 21. Then, the display control unit 250b moves the linear movement bar 21 linearly in a direction indicated by the linear movement bar 21.

Step S23 illustrates that if, while the display control unit 250b is moving the linear movement bar 21 linearly, the button of the switch 220 has been single-clicked by the user, just like at Step S13 in FIG. 6, the display control unit 250b determines that the starting point of the linear movement bar 21 (the pointer position 20) at the time of the single-click has been selected, and ends the process.

On the other hand, if, while the display control unit 250b is moving the linear movement bar 21 linearly, the button of the switch 220 has been double-clicked by the user, the display control unit 250b sets the current pointer position 20 as an initial pointer position.

Step S24 illustrates that while the button of the switch 220 is being pressed, the display control unit 250b displays the linear movement bar 21 and rotates the linear movement bar 21 around the initial pointer position 20. For example, when the user double-clicks the button, the user keeps the second click on the button from releasing, thereby continuing pressing the button.

The display control unit 250b can reduce the speed of rotating the linear movement bar 21 at Step S24 to be lower than the speed of rotating the linear movement bar 21 at Step S21. The second pointer position is at a shorter distance from the target 30 than the first pointer position. Therefore, by reducing the speed of rotating the linear movement bar 21 starting from the second or subsequent pointer position, the direction of the linear movement bar 21 can be easily set toward the target 30.

Step S25 illustrates that the user refers to the screen 230a and releases the button of the switch 220 at certain timing. When the display control unit 250b has detected that the button of the switch 220 has become not pressed, the display control unit 250b stops rotating the linear movement bar 21. Then, the display control unit 250b moves the linear movement bar 21 linearly in a direction indicated by the linear movement bar 21. If, while the display control unit 250b is moving the linear movement bar 21 linearly, the button of the switch 220 has been single-clicked by the user, just like at Step S13 in FIG. 6, the display control unit 250b determines that the target 30 located at the starting point of the linear movement bar 21 (the pointer position 20) at the time of the single-click has been selected.

Incidentally, at Step S23, if the button of the switch 220 has been double-clicked, the display control unit 250b further performs the processes at Steps S24 and S25 according to the first path definition. Alternatively, for example, the display control unit 250b can perform the subsequent processes by switching the step to the second or third path definition each time the button of the switch 220 is double-clicked. Whether or not to switch the steps to those of another path definition shall be set in the pointing support device 200 by the user in advance.

Figure 10:
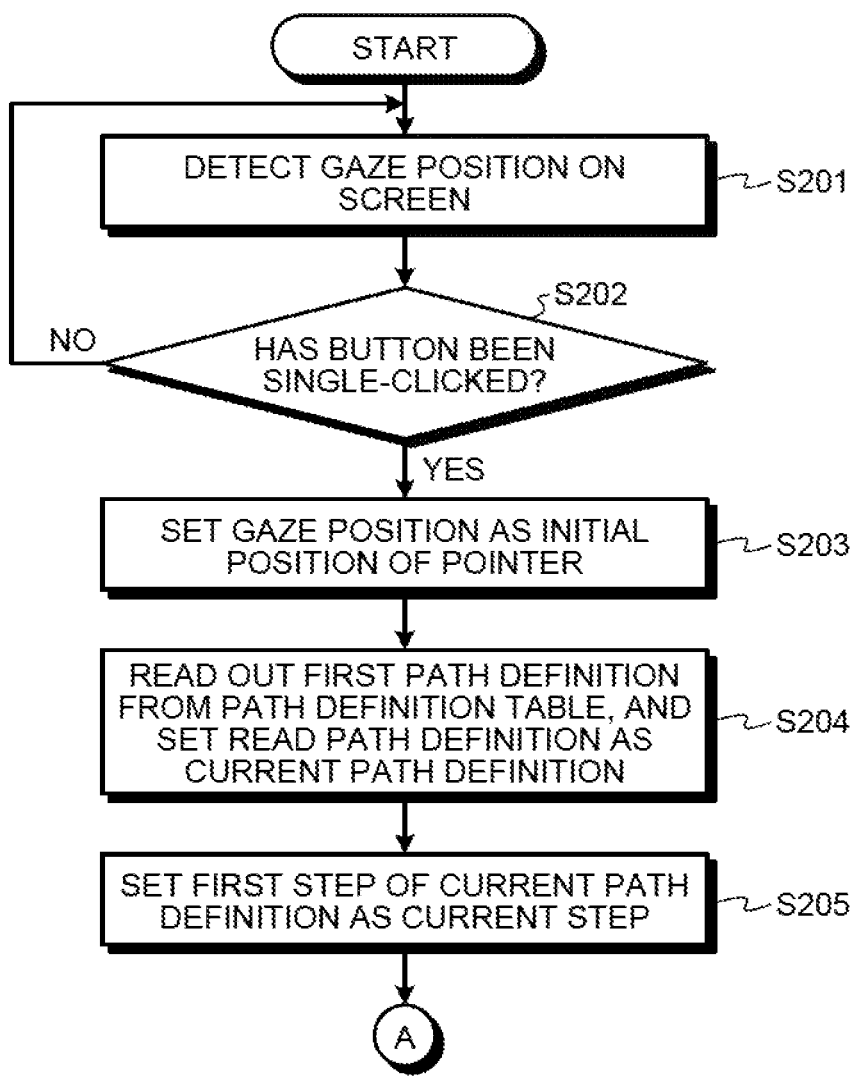
FIG. 10 is a flowchart (1) illustrating a procedure of processing by the pointing support device according to the second embodiment.
Figure 11:
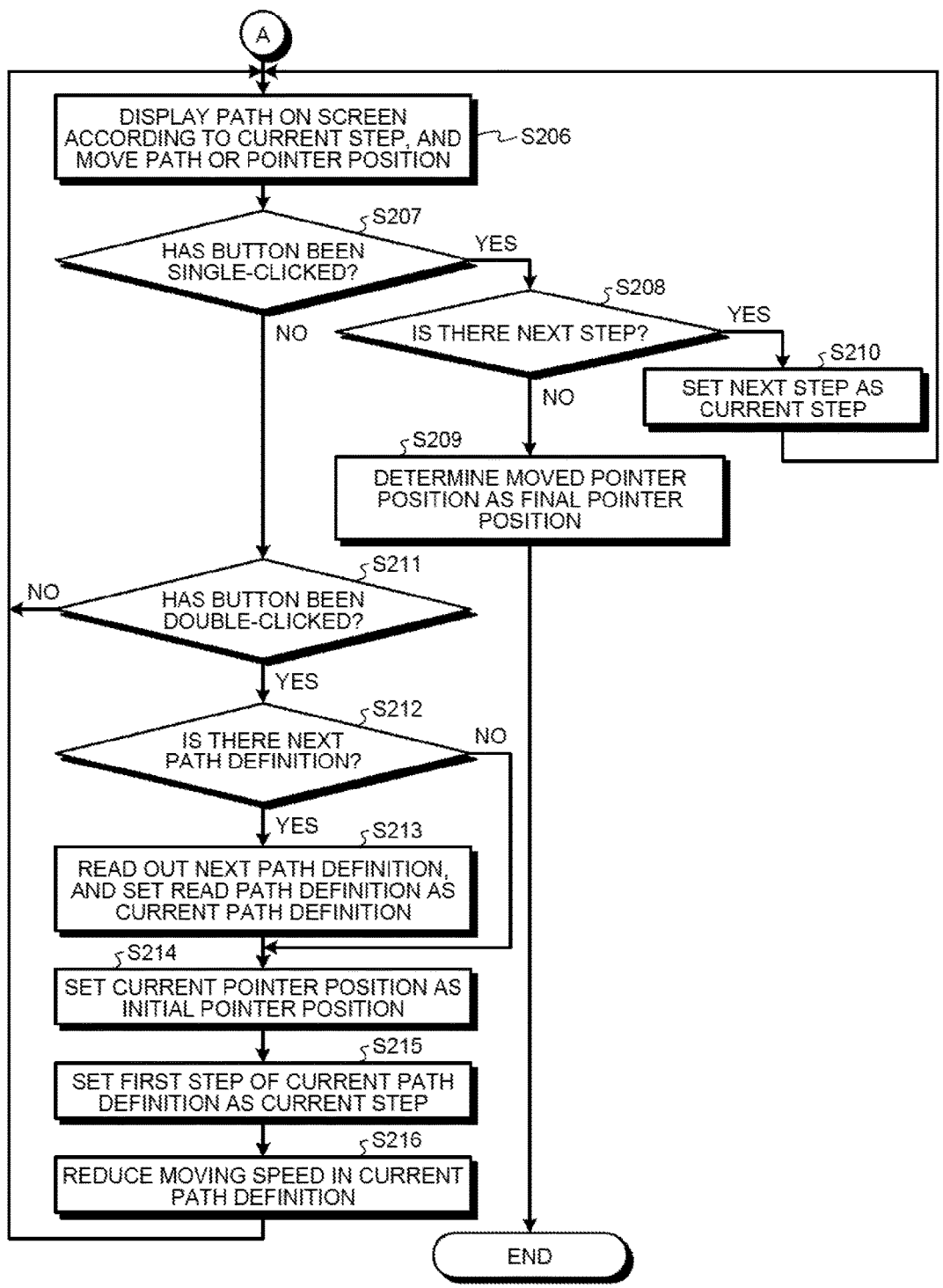
FIG. 11 is a flowchart (2) illustrating the procedure of processing by the pointing support device according to the second embodiment.

Subsequently, a procedure of processing by the pointing support device 200 according to the second embodiment is explained. FIGS. 10 and 11 are flowcharts illustrating the procedure of processing by the pointing support device according to the second embodiment. As illustrated in FIG. 10, the gaze-position detecting unit 250a of the pointing support device 200 detects the gaze position on the screen (Step S201). If the button of the switch 220 has not been single-clicked (NO at Step S202), the display control unit 250b of the pointing support device 200 returns the process to Step S201.

On the other hand, if the button of the switch 220 has been single-clicked (YES at Step S202), the display control unit 250b sets the gaze position as an initial position of a pointer (Step S203). The display control unit 250b reads out the first path definition from the path definition table 240a, and sets the read path definition as the current path definition (Step S204).

The display control unit 250b sets the first step of the current path definition as the current step (Step S205), and goes on to Step S206 in FIG. 11.

Moving on to the explanation of FIG. 11, the display control unit 250b displays a path on the screen according to the current step and moves the path or the pointer position (Step S206). If the button of the switch 220 has been single-clicked (YES at Step S207), the display control unit 250b goes on to Step S208. If the button of the switch 220 has not been single-clicked (NO at Step S207), the display control unit 250b goes on to Step S211.

The display control unit 250b determines whether there is the next step (Step S208). If there is no next step (NO at Step S208), the display control unit 250b determines the moved pointer position as the final pointer position (Step S209).

Processes after Step S208 are explained. If there is the next step (YES at Step S208), the display control unit 250b sets the next step as the current step (Step S210), and returns to Step S206.

Processes at and after Step S211 are explained. The display control unit 250b determines whether the button of the switch 220 has been double-clicked (Step S211). If the button has not been double-clicked (NO at Step S211), the display control unit 250b returns to Step S206.

If the button has been double-clicked (YES at Step S211), the display control unit 250b determines whether there is the next path definition (Step S212). If there is no next path definition (NO at Step S212), the display control unit 250b goes on to Step S214.

If there is the next path definition (YES at Step S212), the display control unit 250b reads out the next path definition, and sets the read path definition as the current path definition (Step S213). The display control unit 250b sets the current pointer position as the initial pointer position (Step S214).

The display control unit 250b sets the first step of the current path definition as the current step (Step S215). The display control unit 250b reduces the moving speed in the current path definition (Step S216), and returns to Step S206.

Subsequently, advantageous effects of the pointing support device 200 according to the second embodiment are explained. The pointing support device 200 sets the gaze position as an initial position of a pointer, and displays a path starting from the initial position on the screen on the basis of the path definition table 240a and moves the pointer along the path. Furthermore, if the button of the switch 220 has been double-clicked while the pointing support device 200 is moving the pointer along the path, the pointing support device 200 moves the path so as to display the path starting from the position of the pointer at the time of the double-click on the screen, and moves the pointer along the path. Therefore, even if the accuracy of the gaze position is low, it is possible to move the pointer position from the initial position to a target according to a path definition, and possible to point to the target appropriately.

Moreover, when the switch 220 has received a double-click on the button, and the display control unit 250b moves the path by switching the starting point of the path to the position of the pointer at the time of the receipt of the double-click, the display control unit 250b reduces the moving speed to be lower than the previous moving speed. Accordingly, even if the position of a target is close to the current pointer, it is possible to bring the position of the path to the target accurately.

Incidentally, the above-described processes performed by the pointing support devices 100 and 200 according to the first and second embodiments are just an example, and the pointing support devices 100 and 200 can perform other processes. Other processes (1) to (5) performed by any of the pointing support devices 100 and 200 are explained below. Here, for convenience of explanation, the other processes shall be performed by the pointing support device 200.

Figure 12:
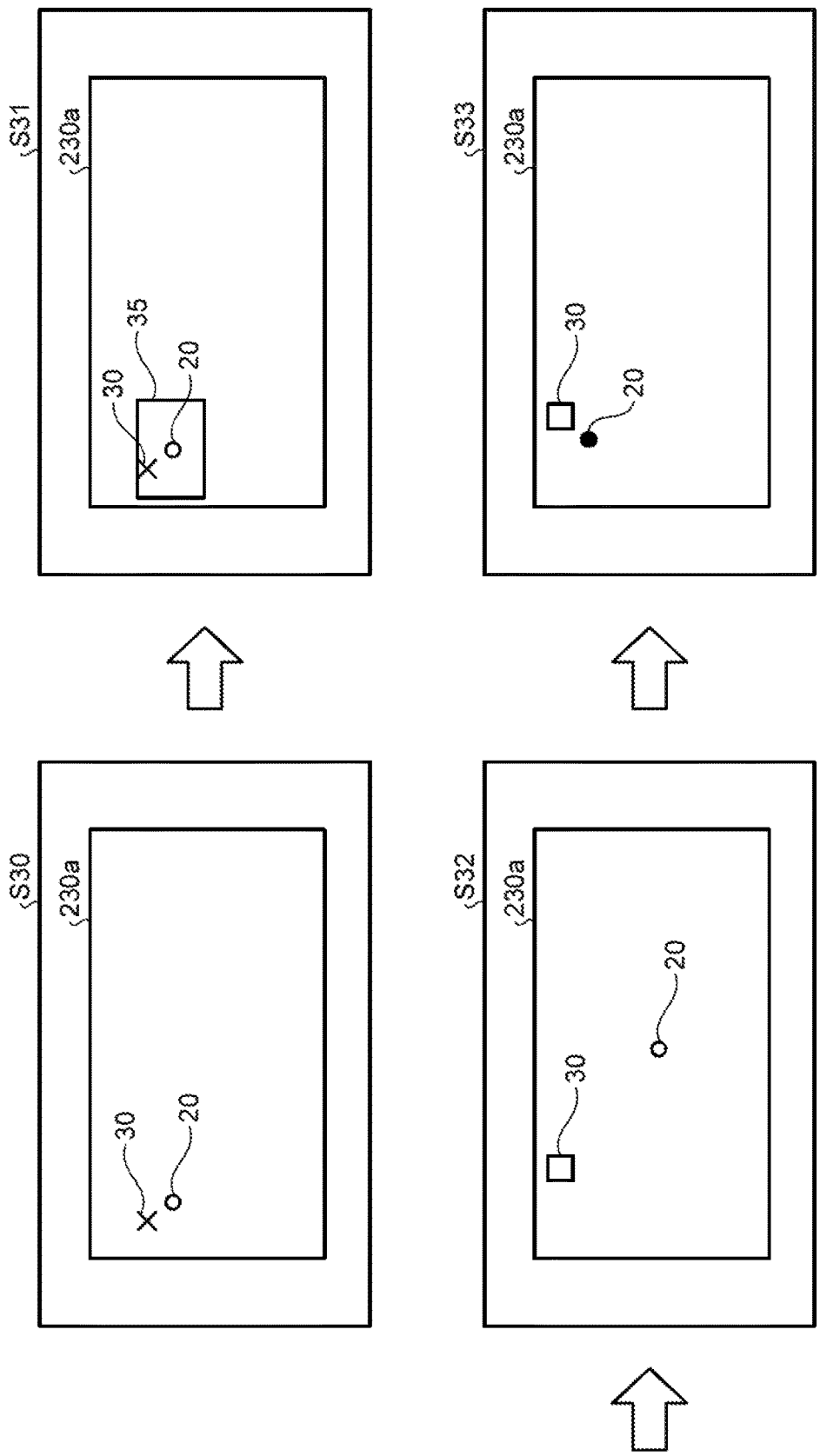
FIG. 12 is a diagram for explaining another process (1) performed by the pointing support device.

Another process (1) performed by the pointing support device 200 is explained. The display control unit 250b of the pointing support device 200 can enlarge an image of a portion of the screen and display the enlarged image in order to further increase the accuracy of pointing to a target. FIG. 12 is a diagram for explaining the process (1) performed by the pointing support device.

Step S30 illustrates that a pointing target 30 and a gaze position 20 exist on the screen 230a of the display unit 230. The display control unit 250b identifies the location of the gaze position 20 on the basis of gaze position information acquired from the gaze-position detecting unit 250a. For example, the resolution of the screen 230a shall be 1920× 1080.

Step S31 illustrates that when the switch 220 has received a single-click on the button, the display control unit 250b sets the gaze position 20 as an initial position of a pointer. The display control unit 250b enlarges a rectangular box 35 centered at the initial position 20 so as to zoom in the rectangular box 35 from the center thereof. For example, the display control unit 250b can enlarge the rectangular box 35 until the switch 220 has received a single-click on the button again.

Step S32 illustrates that the rectangular box 35 has been enlarged to the same size as the screen 230a. For example, when the rectangular box 35 has been enlarged to the same size as the screen 230a, the 1-pixel target 30 becomes a 5×5-pixel target 30.

Step S33 illustrates that after having enlarged the rectangular box 35, the display control unit 250b again acquires information on the gaze position from the gaze-position detecting unit 250a, and displays the acquired gaze position 20 on the screen 230a. When the rectangular box 35 has been enlarged to full screen, the distance between the target 30 and the initial position of the pointer increases; therefore, the display control unit 250b again updates the initial position of the pointer. For example, if the switch 220 has received a single-click on the button again at Step S33, the display control unit 250b sets the gaze position at the time of the receipt of the single-click as the initial position of the pointer.

As illustrated at Steps S30 to S33, the size of the target 30 becomes larger than before the enlargement; therefore, the user can accurately move the pointer.

Figure 13:
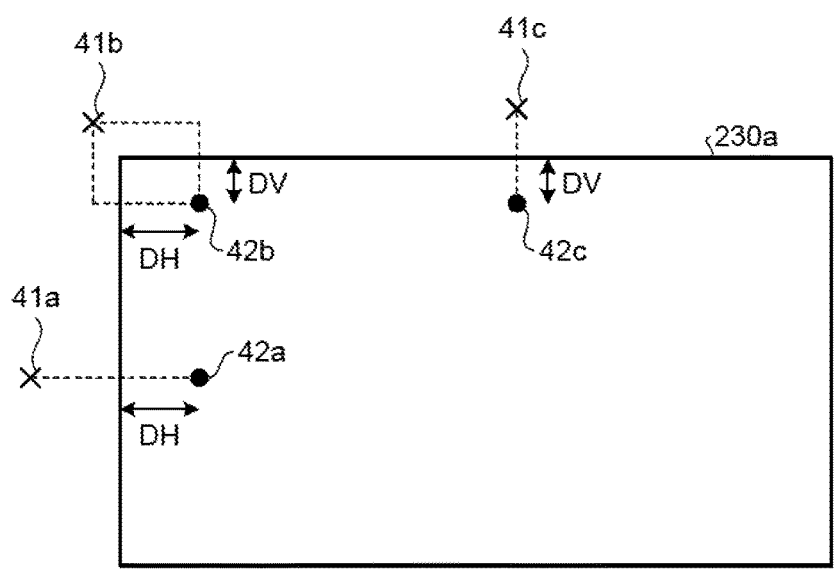
FIG. 13 is a diagram for explaining another process (2) performed by the pointing support device.

Another process (2) performed by the pointing support device 200 is explained. FIG. 13 is a diagram for explaining the process (2) performed by the pointing support device. If the gaze position has deviated from the screen 230a, the display control unit 250b corrects the gaze position so as to be within the screen 230a.

If the gaze position is outside of an area of the screen 230a in a horizontal direction, the display control unit 250b corrects the gaze position so as to be located within DH pixels in the horizontal direction. Furthermore, if the gaze position is outside of the area of the screen 230a in a vertical direction, the display control unit 250b corrects the gaze position so as to be located within DV pixels in the vertical direction.

As illustrated in FIG. 13, in a case of a gaze position 41a, the display control unit 250b corrects the gaze position 41a so as to be a gaze position 42a. In a case of a gaze position 41b, the display control unit 250b corrects the gaze position 41b so as to be a gaze position 42b. In a case of a gaze position 41c, the display control unit 250b corrects the gaze position 41c so as to be a gaze position 42c.

As described above, if the gaze position is located outside of the screen, the display control unit 250b corrects the gaze position so as to be within the screen, thereby enabling the gaze position to be always located within the screen.

Figure 14:
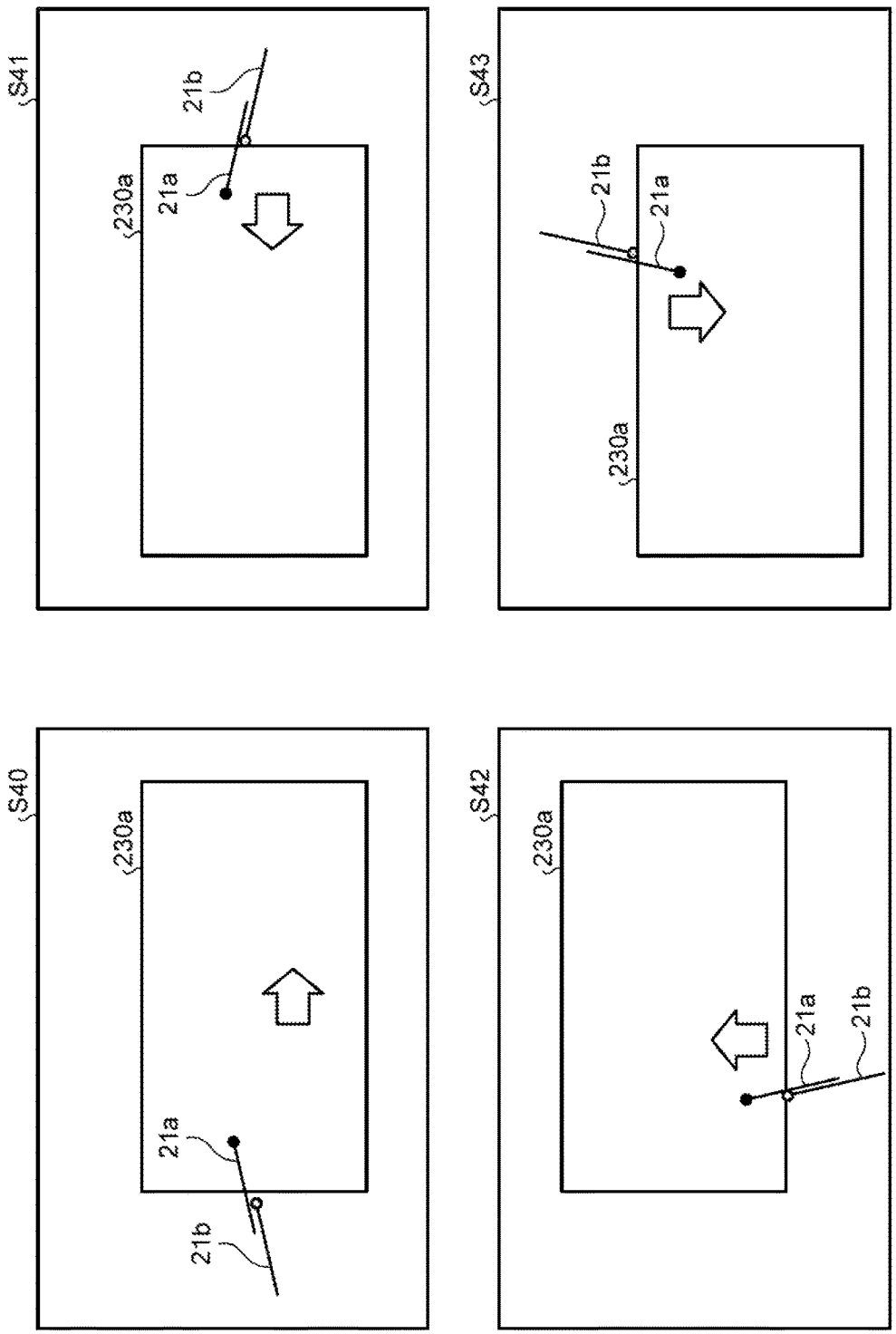
FIG. 14 is a diagram for explaining another process (3) performed by the pointing support device.

Another process (3) performed by the pointing support device 200 is explained. FIG. 14 is a diagram for explaining the process (3) performed by the pointing support device. At the step of moving the pointer position linearly, if a destination of the linear movement has moved outside of the screen 230a or an active window, the display control unit 250b performs scrolling so that a screen in the destination can be brought into view.

Step S40 illustrates that, for example, at Step 1 of the first path definition, the display control unit 250b determines the position and direction of the linear movement bar 21; at Step 2, the display control unit 250b moves the linear movement bar 21 in the direction of the linear movement bar 21. The linear movement bar 21 before the movement is referred to as a linear movement bar 21a, and the linear movement bar 21 after the movement is referred to as a linear movement bar 21b. In this case, the display control unit 250b scrolls an image of the screen 230a to the right until an instruction to stop the linear movement is issued or it reaches the limit of scrolling the screen 230a to the right. The method to scroll to the right is not limited to this; alternatively, the display control unit 250b can scroll the screen 230a to the right by the subregion.

Step S41 illustrates that at Step 1 of the first path definition, the display control unit 250b determines the position and direction of the linear movement bar 21; at Step 2, the display control unit 250b moves the linear movement bar 21 in the direction of the linear movement bar 21. The linear movement bar 21 before the movement is referred to as the linear movement bar 21a, and the linear movement bar 21 after the movement is referred to as the linear movement bar 21b. In this case, the display control unit 250b scrolls an image of the screen 230a to the left until an instruction to stop the linear movement is issued or it reaches the limit of scrolling the screen 230a to the left. The method to scroll to the left is not limited to this; alternatively, the display control unit 250b can scroll the screen 230a to the left by the subregion.

Step S42 illustrates that at Step 1 of the first path definition, the display control unit 250b determines the position and direction of the linear movement bar 21; at Step 2, the display control unit 250b moves the linear movement bar 21 in the direction of the linear movement bar 21. The linear movement bar 21 before the movement is referred to as the linear movement bar 21a, and the linear movement bar 21 after the movement is referred to as the linear movement bar 21b. In this case, the display control unit 250b scrolls up an image of the screen 230a until an instruction to stop the linear movement is issued or it reaches the limit of scrolling up the screen 230a. The method to scroll up is not limited to this; alternatively, the display control unit 250b can scroll up the screen 230a by the subregion.

Step S43 illustrates that at Step 1 of the first path definition, the display control unit 250b determines the position and direction of the linear movement bar 21; at Step 2, the display control unit 250b moves the linear movement bar 21 in the direction of the linear movement bar 21. The linear movement bar 21 before the movement is referred to as the linear movement bar 21a, and the linear movement bar 21 after the movement is referred to as the linear movement bar 21b. In this case, the display control unit 250b scrolls down an image of the screen 230a until an instruction to stop the linear movement is issued or it reaches the limit of scrolling down the screen 230a. The method to scroll down is not limited to this; alternatively, the display control unit 250b can scroll down the screen 230a by the subregion.

If the path or pointer position being moved has deviated from an area of a screen or an area of the active window, the display control unit 250b scrolls the area of the screen or active window. Therefore, the user can easily scroll the screen in his/her intended direction.

Another process (4) performed by the pointing support device 200 is explained. The display control unit 250b determines whether a selection has been made on the basis of whether the button of the switch 220 has been clicked; however, the determination method is not limited to this, and the display control unit 250b can receive a gesture input and determine whether a selection has been made on the basis of the gesture input.

For example, if the display control unit 250b has detected that the user has closed his/her eyelid for a given length of time, the display control unit 250b determines that a selection has been made. For example, the display control unit 250b is connected to a camera (not illustrated), and determines whether the user has closed his/her eyelid by performing template matching or the like.

Figure 15:
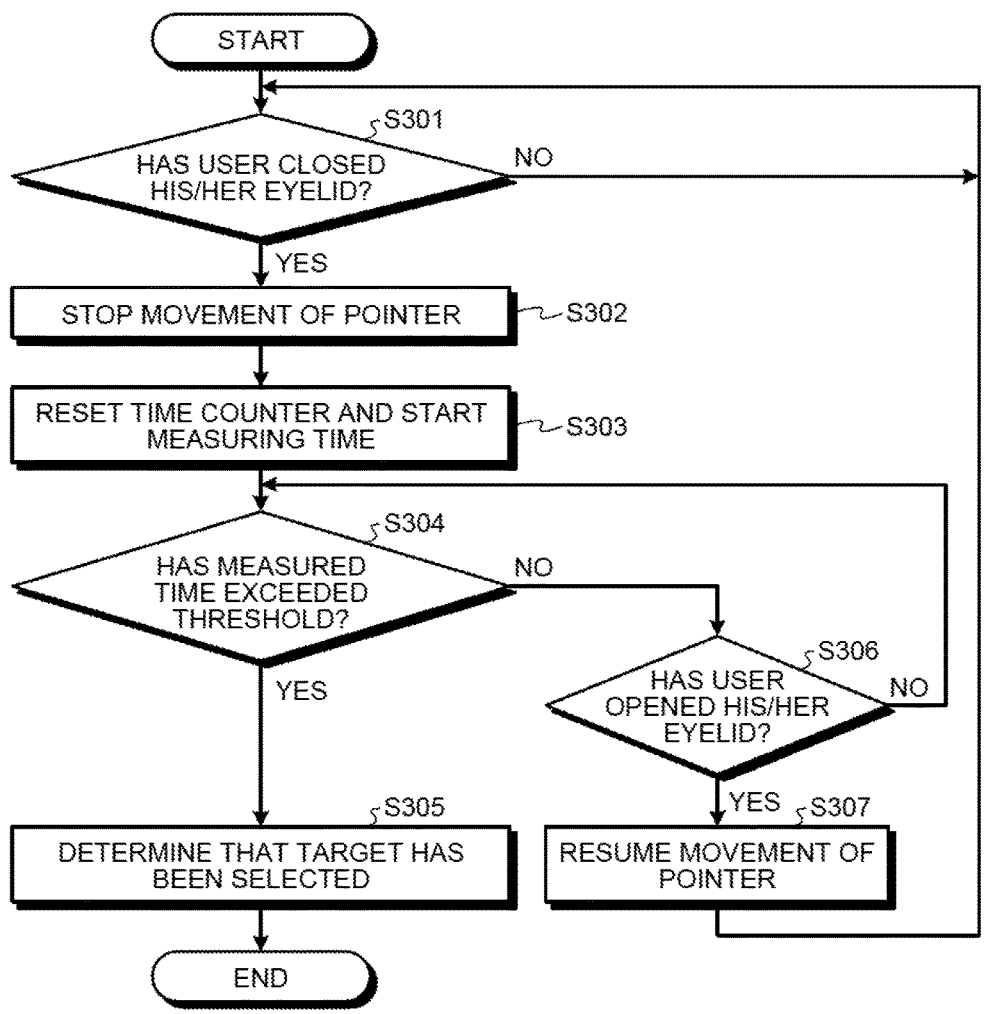
FIG. 15 is a flowchart illustrating a procedure for the display control unit to receive a gesture input.

FIG. 15 is a flowchart illustrating a procedure for the display control unit to receive a gesture input. As illustrated in FIG. 15, the display control unit 250b determines whether the user has closed his/her eyelid (Step S301). If the user has not closed his/her eyelid (NO at Step S301), the display control unit 250b repeats Step S301.

If the user has closed his/her eyelid (YES at Step S301), the display control unit 250b stops the movement of a pointer (Step S302). The movement of a pointer at Step S302 means, for example, as illustrated at Step 2 in FIG. 3, the pointer position moves along with the movement of the linear movement bar 21. The display control unit 250b resets a time counter, and starts the measuring the time (Step S303).

If the measured time has exceeded a threshold (YES at Step S304), the display control unit 250b determines that a target overlapping with the pointer has been selected (Step S305).

On the other hand, if the measured time has not exceeded the threshold (NO at Step S304), the display control unit 250b determines whether the user has opened his/her eyelid (Step S306). If the user has not opened his/her eyelid (NO at Step S306), the display control unit 250b returns to Step S304.

If the user has opened his/her eyelid (YES at Step S306), the display control unit 250b resumes the movement of the pointer (Step S307), and returns to Step S301.

As described above, the display control unit 250b receives a selection on the basis of a user's gesture; therefore, the user can select a target without pressing the button of the switch 220.

Another process (5) performed by the pointing support device 200 is explained. The display control unit 250b receives various selections through the switch 220 or user's gestures; besides these, the display control unit 250b can receive a selection on the basis of a voice input. For example, the pointing support device 200 further includes a microphone (not illustrated) and a voice recognition unit connected to the microphone; the voice recognition unit outputs a signal to the display control unit 250b when having received a predetermined voice input.

For example, when the voice recognition unit has received a voice input, such as "Start", "Stop", or "Determine", from the user, the voice recognition unit outputs a signal to the display control unit 250b. When the display control unit 250b has received the signal from the voice recognition unit, the display control unit 250b performs the same process as in the case of receipt of a selection.

As described above, the display control unit 250b receives a selection made by a signal based on a voice input; therefore, the user can select a target without pressing the button of the switch 220.

Furthermore, when the display control unit 250b moves the path according to the third path definition illustrated in FIG. 5, the display control unit 250b can omit any of Steps 1 to 4 of the third path definition on the basis of a voice input. For example, if the moving direction is ordered by voice inputs "Right" and "Down", the display control unit 250b moves the vertical guide 13a to the right according to Step 1, and then moves the horizontal guide 13b down according to Step 4.

Figure 16:
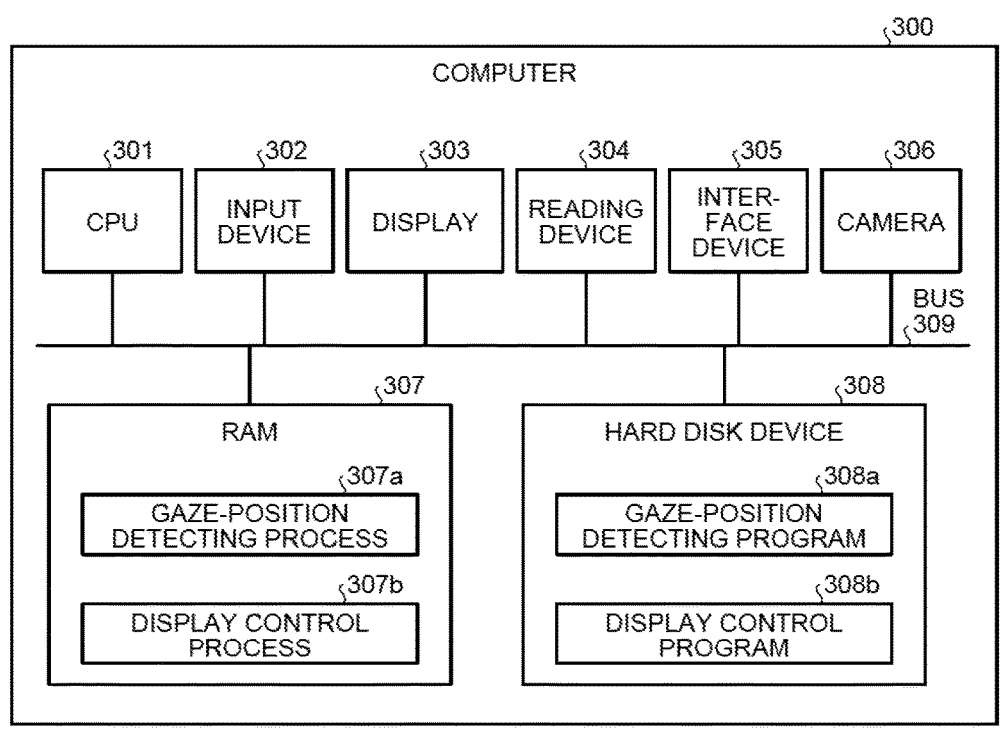
FIG. 16 is a diagram illustrating an example of a computer that executes a pointing support program.

Subsequently, there is described an example of a computer that executes a pointing support program realizing the same functions as any of the pointing support devices 100 and 200 according to the first and second embodiments. FIG. 16 is a diagram illustrating an example of a computer that executes the pointing support program.

As illustrated in FIG. 16, a computer 300 includes a CPU 301 that performs various arithmetic processing, an input device 302 that receives an input of data from the user, and a display 303. Furthermore, the computer 300 includes a reading device 304 that reads a program or the like from a storage medium, an interface device 305 that performs data transfer between the computer 300 and another computer via a network, and a camera 306. Moreover, the computer 300 includes a RAM 307 and a hard disk device 308; the RAM 307 temporarily stores therein a variety of information. The devices 301 to 308 are connected to a bus 309.

The hard disk device 308 includes a gaze-position detecting program 308a and a display control program 308b. The CPU 301 reads and expands the gaze-position detecting program 308a and the display control program 308b into the RAM 307.

The gaze-position detecting program 308a serves as a gaze-position detecting process 307a. The display control program 308b serves as a display control process 307b.

The gaze-position detecting process 307a corresponds to any of the processes performed by the gaze-position detecting units 150a and 250a. The display control process 307b corresponds to any of the processes performed by the display control units 150b and 250b.

Incidentally, the gaze-position detecting program 308a and the display control program 308b do not necessarily have to be stored in the hard disk device 308 from the beginning. For example, these programs can be stored in a "portable physical medium," such as a flexible disk (FD), a CD-ROM, a digital versatile disc (DVD), a magneto-optical disk, or an IC card, to be inserted into the computer 300 so that the computer 300 can read out and execute the programs 308a and 308b.

It is possible to perform pointing appropriately through a gaze input.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A pointing support device comprising:
a memory that includes path definition information, which defines a path to move a pointer and a movement pattern of the path; and
a processor that executes a process including:
  detecting a gaze position of a user on a screen;
  outputting a signal, when having received a predetermined instruction from the user;
  setting the gaze position as an initial position of the pointer at the time of acquisition of the signal;
  displaying the path starting from the initial position on the screen first moving the path based on the movement pattern of the path;
  second moving the pointer along the path; and
  determining moved position of the pointer along the path as the final pointer position when having received an instruction from the user
  wherein each time the starting point of the path is switched due to acquisition of the signal, the first moving reduces the speed of moving the path to be lower than a previous moving speed and the second moving reduces the speed of moving the pointer on the path to be lower than a previous moving speed.

2. The pointing support device according to claim 1, wherein
the first moving moves the path while a button is being pressed, and stops moving the path at timing when the button has become not pressed and the second moving moves the pointer while the button is being pressed and stops moving the pointer at timing when the button has become not pressed.

3. The pointing support device according to claim 1, wherein
the outputting outputs information on pressing force applied to a button, and
the first moving controls the speed of moving the path on the basis of the pressing force applied to the button and the second moving controls the speed of moving the pointer on the basis of the pressing force applied to the button.

4. The pointing support device according to claim 1, wherein
the detecting detects user's gaze position on an enlarged image area.

5. The pointing support device according to claim 1, the process further comprising scrolling an area of the screen or active window, when the pointer moving on the path has deviated from the area of the screen or the area of the active window.

6. The pointing support device according to claim 1, wherein
the setting sets the gaze position at the time of receipt of a voice input as the initial position, and the first moving controls the movement of the path on the basis of the voice input and the second moving controls the movement of the pointer on the basis of the voice input.

7. The pointing support device according to claim 1, wherein
the setting sets the gaze position at a time of detection of a predetermined gesture as the initial position, and the first moving controls the movement of the path on the basis of the predetermined gesture and the second moving controls the movement of the pointer on the basis of the predetermined gesture.

8. A pointing support method comprising:
detecting a gaze position of a user on a screen, using a processor;
outputting a signal, when having received a predetermined instruction from the user, using a processor;
setting the gaze position as an initial position of the pointer at the time of acquisition of the signal, using the processor;
displaying a path starting from the initial position on the screen on the basis of path definition information, which defines the path to move the pointer and a movement pattern of the path, using the processor;
first moving the path based on the movement pattern of the path;
second moving the pointer along the path, using the processor; and
determining moved position of the pointer along the path as the final pointer position when having received an instruction from the user, using the processor
wherein each time the starting point of the path is switched due to acquisition of the signal, the first moving reduces the speed of moving the path to be lower than a previous moving speed and the second moving reduces the speed of moving the pointer on the path to be lower than a previous moving speed.

9. The pointing support method according to claim 8, wherein
the first moving moves the path or the pointer while a button is being pressed, and stops moving the path at timing when the button has become not pressed and the second moving moves the pointer while the button is being pressed and stops moving the pointer at timing when the button has become not pressed.

10. The pointing support method according to claim 8, wherein
the outputting outputs information on pressing force applied to a button, and
the first moving controls the speed of moving the path on the basis of the pressing force applied to the button and the second moving controls the speed of moving the pointer on the basis of the pressing force applied to the button.

11. The pointing support method according to claim 8, wherein
the detecting detects user's gaze position on an enlarged image area.

12. The pointing support method according to claim 8, further comprising, scrolling an area of the screen or active window, when the pointer moving on the path has deviated from the area of the screen or the area of the active window.

13. The pointing support method according to claim 8, wherein
the setting sets the gaze position at the time of receipt of a voice input as the initial position, and the first moving controls the movement of the path on the basis of the voice input and the second moving controls the movement of the pointer on the basis of the voice input.

14. The pointing support method according to claim 8, wherein
the setting sets the gaze position at the time of detection of a predetermined gesture as the initial position, and the first moving controls the movement of the path on the basis of the predetermined gesture and the second moving controls the movement of the pointer on the basis of the predetermined gesture.

15. A non-transitory computer-readable recording medium having stored therein a pointing support program that causes a computer to execute a process comprising:
detecting a gaze position of a user on a screen;
outputting a signal, when having received a predetermined instruction from the user;
setting the gaze position as an initial position of the pointer at the time of acquisition of the signal;
displaying a path starting from the initial position on the screen on the basis of path definition information, which defines the path to move the pointer and a movement pattern of the path;
first moving the path based on the movement pattern of the path;
second moving the pointer along the path; and
determining moved position of the pointer along the path as the final pointer position when having received an instruction from the user
wherein each time the starting point of the path is switched due to acquisition of the signal, the first moving reduces the speed of moving the path to be lower than a previous moving speed and the second moving reduces the speed of moving the pointer on the path to be lower than a previous moving speed.

* * * * *